Dec. 22, 1970  E. J. DZIEDZIULA  3,548,429
RIGHTING SYSTEM FOR VEHICLE
Filed Nov. 5, 1968  2 Sheets-Sheet 1

INVENTOR:
EDWARD J. DZIEDZIULA,
BY William G. Becker
AGENT

Dec. 22, 1970    E. J. DZIEDZIULA    3,548,429
RIGHTING SYSTEM FOR VEHICLE
Filed Nov. 5, 1968    2 Sheets-Sheet 2
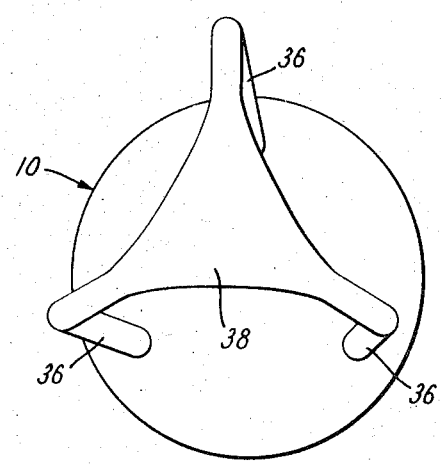
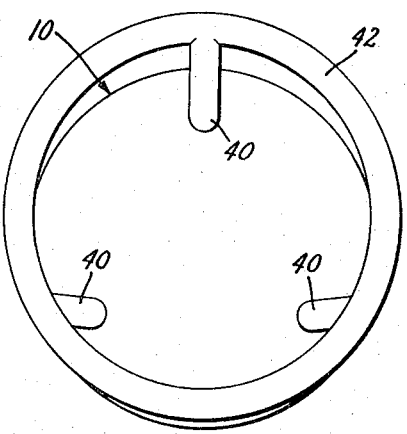
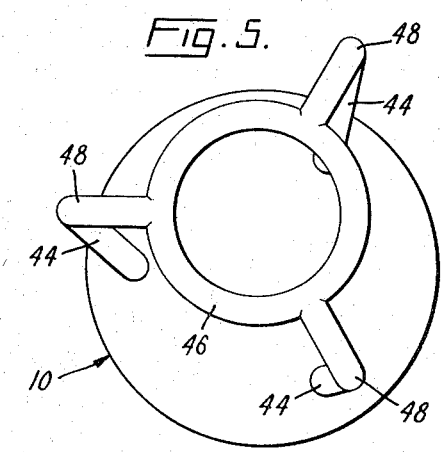
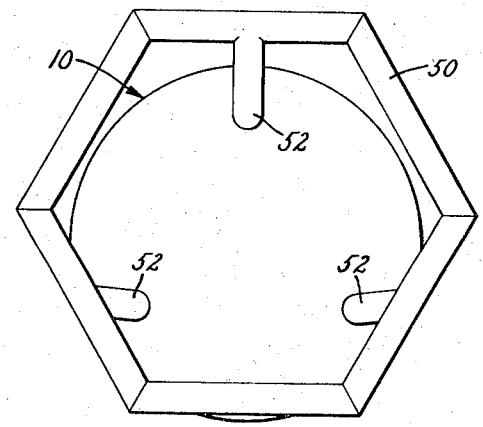
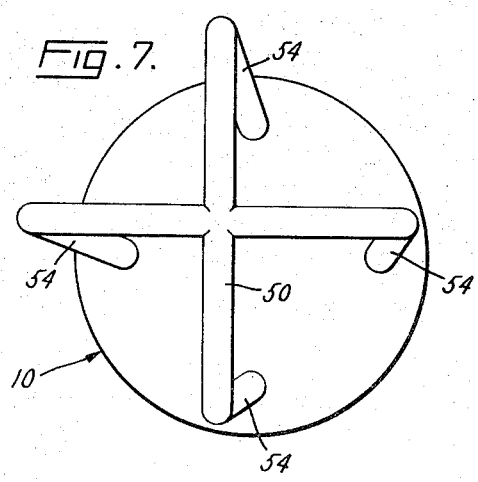
INVENTOR:
EDWARD J. DZIEDZIULA,
BY
AGENT United States Patent Office 3,548,429
Patented Dec. 22, 1970

3,548,429
RIGHTING SYSTEM FOR VEHICLE
Edward J. Dziedziula, Phoenixville, Pa., assignor to General Electric Company, a corporation of New York
Filed Nov. 5, 1968, Ser. No. 773,608
Int. Cl. B63b 21/00
U.S. Cl. 9—8    13 Claims

ABSTRACT OF THE DISCLOSURE

Apparatus for righting a floating body and/or maintaining it in a righted position. An elongated structure at least partially of flotation material is structured so that when fully erected the horizontal distance from a point on an upper portion of the structure to the center of gravity of the body is greater than the horizontal distance from that point to the center of buoyancy of the body, except when the vehicle is fully righted. In the fully righted position these distances are equal.

BACKGROUND OF THE INVENTION

The subject invention generally relates to safety devices for floating bodies and, in particular, to righting apparatus for such bodies.

Due to many factors, such as weather or sea conditions, independent design parameters, or the type of entry a body makes into water, it is possible for a floating body to become oriented in an undesirable (capsized) position. This is an extremely important problem in such areas as the recovery of manned or unmanned re-entry or escape vehicles and also in the general area of small boating wherein it may be extremely difficult or impossible for occupants of such vehicles to right them or for others to detect such vehicles in their capsized position. Many floatation devices have been developed which generally prevent the sinking of vehicles or may aid in stabilizing them, but none of these provide a simple apparatus for automatic or manual righting of a body under any weather or sea conditions while additionally aiding in the detection by others of such a body. It is generally desirable that such righting apparatus be simple, light in weight, and/or occupy a small volume when not needed.

SUMMARY OF THE INVENTION

Accordingly, an object of this invention is to provide a simple, lightweight righting apparatus for a floating body.

A further object is to provide a righting apparatus which is automatically deployed.

A still further object is to provide a righting device which also aids in the detection by others of the body.

Yet another object of this invention is to provide a righting device which also assists in reducing shock, due to tumbling, on a body which lands on the water surface from the air.

In order to fulfill the above-stated objects, the subject invention provides a righting apparatus for a floating body which includes an elongated structure extending from the upper surface of the body with at least an upper portion of said structure being of a low density floatation material. The upper portion of the righting structure, when fully extended, is such that the body must assume an orientation where the horizontal distance between a given point on the upper portion and the center of gravity of the body is greater than the horizontal distance between the aforementioned given point and the center of buoyancy of the body except when the body is in the righted position. In the righted position these mentioned distances are equal. The structure may be formed wholly or in part of any material having the desired buoyancy and other characteristics, such as solid foam material or hollow members inflated with any suitable gas, liquid or foam. The righting apparatus may be permanently mounted in its extended position, or partially or wholly stored within the body with provision for its extension to the desired configuration.

The subject matter which is regarded as the present invention is particularly pointed out and distinctly claimed in the concluding portion of the specification.

BRIEF DESCRIPTION OF THE DRAWINGS

The subject invention, however, together with further objects and advantages thereof, may best be understood by reference to the following description taken in connection with the accompanying drawings in which:

FIGS. 3–7 are perspective views of a body including different embodiments of righting apparatus in accordance with the subject invention.

DESCRIPTION OF THE PREFERRED EMBODIMENTS

The basic idea of the subject invention may be structurally manifested in a variety of different embodiments and is adaptable to perform a wide variety of different functions.

Figure 1A:
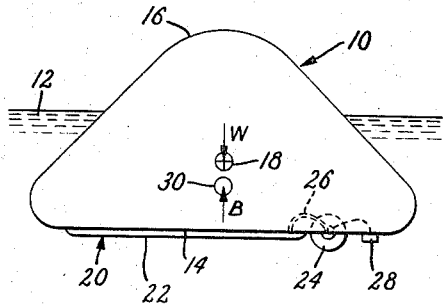
FIG. 1a–d are side views of a body having a righting apparatus in accordance with the subject invention, showing four stages in the righting of the body.

In FIGS. 1a–d and 2 one embodiment of the subject invention is shown which illustrates the basic principle involved. FIG. 1a shows a body 10, incorporating a righting apparatus in accordance with the subject invention, which is floating upside down in a body of water, the water line designated by a line 12. The body 10 is a substantially frustro-conical solid member having a substantially flat upper surface 14, a rounded lower apex 16 and a center of gravity designated 18.

The righting apparatus consists of an inflatable structure 20, which in this view is hidden below a releasable covering 22; a gas cylinder 24, which is connected to the inflatable structure 20 by suitable tubing 26; and a release device 28 for the apparatus. The center of buoyancy of the body is designated as 30.

It will be observed that the center of buoyancy of a body floating in a liquid is in reality the center of gravity of the liquid displaced by the body. This means that if the portion of the body below the liquid level line were replaced by an equal volume of the liquid, the center of gravity of this replacing liquid would be at what is considered the center of buoyancy.

The center of gravity of a fixed configuration body will always remain at a fixed point and is ascertainable by empirical or experimental methods well known in the art. As the weight of most righting structures, in accordance with the subject invention, is quite small relative to the weight of the body member itself, for most purposes the center of gravity of the entire body can be considered substantially fixed whether the righting system is or is not extended. The center of buoyancy of a floating body depends on the position of the body in the water as well as the condition (i.e. fully, partially or non-erected) and position of the righting structure. However, at any one instant in time, the center of buoyancy of the entire body is easily ascertainable by empirical or experimental methods, well known in the art.

The forces acting on the body 10 floating in the water can be expressed as a downward force W equalling the weight of the body and acting through the center of gravity 18 of the body and an equal and opposite force B, the buoyancy force, acting vertically upward through the center of buoyance 30 of the body. When the body 10 is at rest, the line of action of each of these forces coincides, i.e. a line joining the center of gravity to center of buoyancy is vertical as is indicated in FIGS. 1a and 1d.

To be in a stable position as opposed to one merely at rest, the orientation of the body in the liquid must be such that when the body is pivoted a small amount from the at rest position in any direction a torque due to the forces (W and B) is developed which tends to return the body to this at rest position. This eliminates from the definition of stable any at rest orientation wherein rotation of the body in a given angular direction causes a torque due to the forces W and B to be developed tending to rotate the body in that same direction, i.e. away from the at rest position. Therefore, not all at rest positions are stable, but all stable positions must also be at rest position. For the body of FIG. 1 with the righting apparatus not extended, there are two stable positions. These are the capsized position, as shown in FIG. 1a, and the righted position, as shown in FIG. 1d.

Figure 1B:
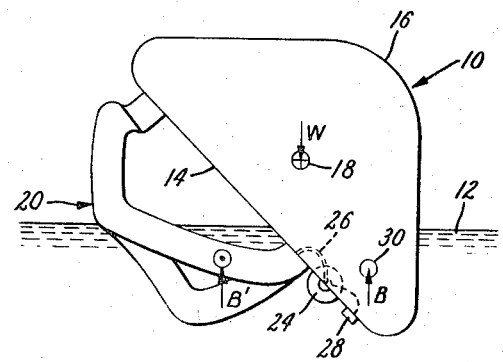

In FIG. 1b, the body 10 is shown with the righting mechanism 20 partially inflated. This inflation process tends to cause the body to be rotated in the clockwise direction as a result of buoyant force (B') developed by the righting mechanism. With the body 10 in this orientation the center of buoyancy 30 is located as shown in FIG. 1b with the forces W, B acting as shown so as to tend to rotate the body 10 in a counter-clockwise direction which would return the body 10 to the capsized position. However, the clockwise rotational effect due to righting apparatus buoyancy force B' more than balances the force couple (W and B) so that the body is rotated in a clockwise direction, thereby assuming the position shown in FIG. 1c at the instant the righting structure 20 is fully inflated, i.e. fully erected. When, the righting apparatus is fully erected the capsized position is no longer stable.

Figure 1C:
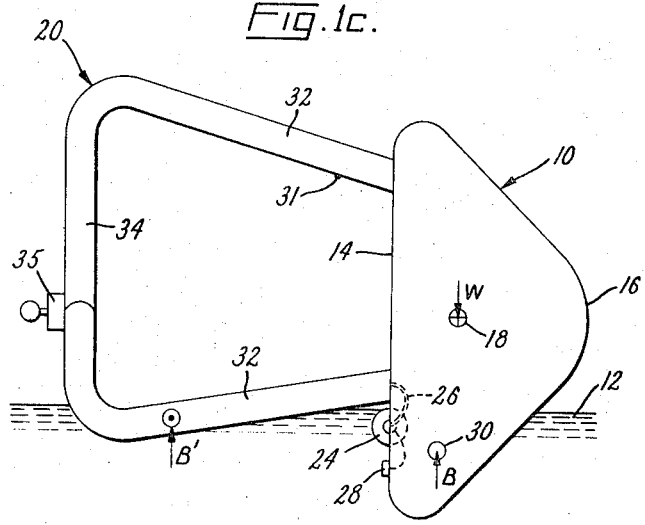
Figure 1D:
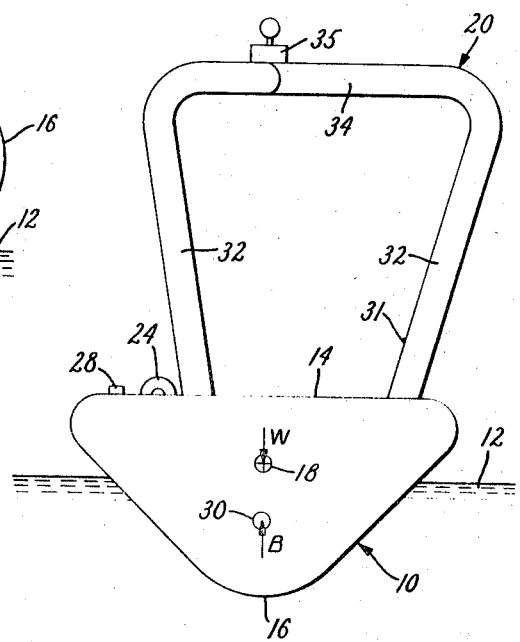

In the orientation shown in FIG. 1c with the righting structure fully inflated (i.e. erected), the body is in an unstable position. The forces W and B' act as clockwise torque around point B tending to cause the body to rotate clockwise to the righted position shown in FIG. 1d.

In the righted position, FIG. 1d, the body is stable, i.e. it is at rest and any rotation of the body causes a torque due to a force couple (W and B) to act on the body tending to return it to its righted position.

One convenient way of expressing the relationship of the righting structure 20 to the body 10 itself which forces the body to maintain itself in only one desired stable position (i.e. fully righted) is in terms of the relationship of the center of gravity and center of buoyancy of the body relative to the configuration of the righting apparatus when fully extended. The upper portion of the righting apparatus is considered to be all of the apparatus extending above the uppermost portion of the body. The body will always right itself to one given stable position when the horizontal distance between any one point, such as 31, on the upper portion of the righting structure 20 (FIG. 1c, d) to the center of gravity 18 of the body is greater than the horizontal distance from that same point 31 to the center of buoyancy 30 of the body. The horizontal distance is the horizontal component of a line joining the point 31 to the center of gravity 18 or center of buoyancy 30 of the body. For this relationship to always be true, no matter how the body is tipped over, the righting apparatus must be of a predetermined structure and configuration. Of course, the structural parameters are dependent on the shape and weight distribution of the body as well as the buoyancy characteristics of portions of the righting apparatus. For most body structures it is necessary that the righting apparatus, when fully extended, prohibit the body from being oriented at an angle substantially greater than 90 degrees from the righted position to assure the desired righting moment will act on the body. By having the righting structure extend upwardly from the upper surface of the body, the body in the capsized position is unstable. The only stable position is the righted position.

Figure 2:
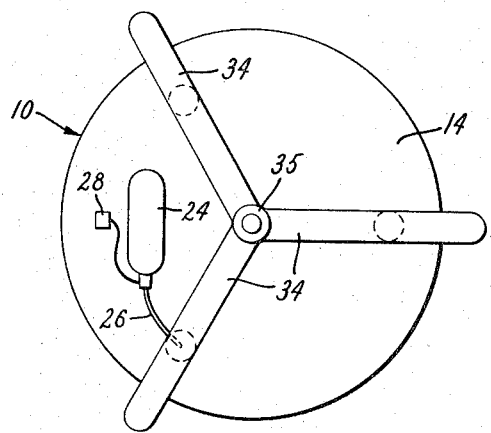
FIG. 2 is a top view of the body as shown in FIG. 1d.

The righting structure of the first embodiment, as best shown in FIGS. 1d and 2, includes three leg portions 32 extending almost vertically from the upper surface of the body 10 and being substantially equally spaced about the perimeter of the upper surface 14. An interconnected portion 34 which is comprised of three substantially radially extending, coplanar members joined at the center is connected at its radially outermost portions to the leg members 32 to assure the desired relationship. It is generally desirable that the righting apparatus include at least three substantially equally spaced leg portions extending from an area adjacent the perimeter of the upper surface of the body or, alternatively, that a continuous surface be utilized. In this embodiment the righting structure members are all hollow members which are waterproof and air-tight and are internally interconnected so that the structure may be inflated from a single fluid source. Also, a battery powered beacon 35 is shown mounted on the uppermost portion 34 to aid in detecting the position of the body 10.

In FIGS. 3-7 other embodiments for the subject invention are shown each of which use three or more leg members with an interconnecting portion. Shown in FIG. 3 is an embodiment having leg members 36 joined together at their uppermost ends by a substantially triangular-shaped plenum chamber 38. In FIG. 4, three leg members 40 are joined together at their uppermost ends by an annular interconnecting hollow member 42, the annular member 42 being connected to the ends of the leg members 40.

A somewhat similar configuration is shown in FIG. 5 wherein three leg members 44 are joined together at their uppermost ends by an annular ring 46 which is connected to the leg members 44 by short, radially extending members 48.

A hexagonally-shaped upper member 50 is connected to the upper end of three members 52 in FIG. 6. The three embodiments shown in FIGS. 4-6 are particularly useful with any payload designed to be dropped into a body of water via parachute including a reentry vehicle wherein it is desirable to have the righting structure fully erected before contact of the payload with the water. As these configurations of righting apparatus all have a substantially open central portion, one or more parachutes may conveniently extend therethrough without significant interference. The possible advantages of having the righting system fully erected before water contact are discussed in the succeeding paragraphs.

Another embodiment is shown in FIG. 7. This embodiment is quite similar to the one shown FIGS. 1a-d and 2 and is comprised of four equally spaced members 54 with two cross members 56 joining opposite leg members and being interconnected substantially at their centers.

The subject invention can be utilized in many different ways. As described above, the righting structure can be used to right a capsized body and prevent it from capsizing again. If the righting structure is erected before the body enters the water or when a body is floating in a righted position, the structure can be used as a means of preventing the body from ever capsizing. This is particularly useful where the body contains a very sensitive payload such as human or other living beings wherein even at a momentary capsizing can have extremely detrimental effects.

With the righting structure fully erected before entry of the body into the water, the structure may be additionally used to lessen shock due to tumbling. Of course, if the structure is to be utilized as a shock absorber, the design, including configuration and materials, must be appropriate to handle the additional shock loads placed on the righting apparatus.

The righting structure may also be used as a means to facilitate locating the body floating in the water or before it lands on the water. In general, the righting apparatus will extend a substantial distance above the upper surface of the body. Visual detection of the body can therefore be increased by painting the righting structure or utilizing material of an easily recognizable color, attaching reflectors to portions of the righting apparatus, and/or by placing a battery-powered light on a portion of the structure. Also a radio transmitter could be utilized in connection with the righting apparatus with portions thereof serving as an antenna or support for an antenna. If desired, suitable reflecting surfaces may be provided by utilizing aluminized material as the righting structure to aid in radar detection of the body.

One possible use of the subject invention is to provide a non-capsizable buoy which might be used as navigational aide, marker, or scientific aide. The elongated structure of the righting apparatus lends itself quite readily to the addition of navigational beacons (either visible or audible) or signal transmitting devices.

As mentioned above, the righting apparatus is extremely desirable for use with re-entry vehicles including payloads from rockets, manned or unmanned space capsules, satellites, etc. The inflatable version of the present invention has particular advantages for these types of uses due to the extremely low weight of the components and small volume needed for storage.

Some other possible uses for the subject invention are in combination with aircraft ejection seats, life rafts from boats or airplanes, or as safety devices for small boats or any floatable object where it is desirable to maintain the object in a righted position. The righting apparatus can be adapted for use with a body of practically any structure.

For many of these uses, it is desirable to have an automatic erecting feature in addition to a manual override. Such an automatic control can include control devices such as G sensors, which on impact of the body onto the water will cause a release of the erecting mechanism; chemical sensors which on contact with the water can cause the release; pressure sensors, which when the body is lowered to the water by parachute can cause a release of the righting apparatus at a predetermined altitude; timing mechanisms, or any other type release mechanism which is well known in the art.

While in the preferred embodiment an inflatable righting structure is shown utilizing a compressed gas cylinder 44 to provide inflation, gas might also be generated by chemical reaction, or other means or, alternatively, the inflatable structure could be filled with a foaming chemical if desired. The righting structure could also be formed of a solid material such as any one of a number of plastic foams having suitable buoyancy characteristics. Any combination of these type materials may be used to form a permanently extended, partially or fully extendible structure. For example, the upper portion of the righting system may be a solid foam type material which is extended when desired by inflation of collapsible leg members. Also, telescoping rods or hinged structural members may be used to extend an upper buoyant portion of an inflatable member or solid buoyant member of suitable configuration.

Therefore, the subject invention provides a righting structure which can be made light in weight, low in cost, small in volume, as well as simple to operate, and which can perform any one or more of the following functions: righting of a capsized body, preventing capsize of a floating body, reducing impact shock of a body entering the water, acting as a means for detecting the body, or acting as a suitable support for indicating or communicating means. As indicated above, many modifications may be made to the subject invention which do not depart from the scope thereof. Accordingly, the scope of this invention is to be construed only in regard to the following claims.

What I desire to secure by Letters Patent of the United States is:

1. A righting apparatus for a floatable body comprising: a righting structure extending from an upper surface of said body and including a portion made of buoyant material, wherein said structure includes at least three substantially equally spaced leg members having a substantial vertical component relative to the upper surface of said body, said structure being of a configuration and location relative to the upper surface of said body such that the horizontal distance between any given point on an upper portion of said structure and the center of gravity of said body is greater than the horizontal distance between said given point and the center of buoyancy of said body except when said body is in a fully righted position.

2. A righting apparatus as in claim 1 wherein said structure is extendible and said righting apparatus includes means for extending said structure.

3. A righting apparatus as in claim 2 wherein at least a portion of said structure is inflatable and wherein inflation means are provided for inflating said inflatable member with a material suitable to provide buoyancy of said inflatable member.

4. A righting apparatus as in claim 3 wherein substantially all of said structure is inflatable, and said means for extending said structure includes said inflation means for inflating said inflatable member.

5. A righting apparatus as in claim 4 wherein said inflation means includes a compressed gas container and means for selectively ducting the compressed gas in said container to said structure.

6. A righting apparatus as in claim 2 wherein said means for extending said structure includes sensor means for automatic actuation thereof in response to a physical condition.

7. A righting apparatus as in claim 6 wherein said sensor means further includes a manual override.

8. A righting apparatus as in claim 1 including a connecting portion joined to said leg members adjacent the uppermost ends thereof.

9. A righting apparatus as in claim 8 wherein said connecting portion includes a polygonally-shaped member.

10. A righting apparatus as in claim 8 wherein said connecting portion includes an annularly-shaped member.

11. A righting apparatus as shown in claim 1 wherein at least a portion of said structure is formed of a buoyant foam material.

12. A righting apparatus as in claim 11 wherein substantially all of structure is formed of a buoyant foam material.

13. A righting apparatus as in claim 1 further including means for aiding in the detection of said body.

References Cited

UNITED STATES PATENTS

| | | | |
|---|---|---|---|
| 1,253,034 | 1/1918 | Heyward | 9—340X |
| 3,048,395 | 8/1962 | Hobbs | 9—8X |
| 2,686,323 | 8/1954 | McCarty, Jr., et al. | 9—3 |
| 3,076,982 | 2/1963 | Rossi et al. | 9—8 |
| 3,084,354 | 4/1963 | Lunenschloss | 9—9X |

TRYGVE M. BLIX, Primary Examiner

J. E. PITTENGER, Assistant Examiner